US012628837B2

(12) United States Patent
Hazenbroek et al.

(10) Patent No.:  US 12,628,837 B2
(45) Date of Patent:     May 19, 2026

(54) DEVICE AND METHOD FOR REMOVING MEAT FROM POULTRY, AND POULTRY CARRIER

(71) Applicant: IFEC B.V., Oud-Beijerland (NL)

(72) Inventors: Jacobus Eliza Hazenbroek, Oud-Beijerland (NL); David Scott Hazenbroek, Oud-Beijerland (NL); Rijk Slagboom, Oud-Beijerland (NL)

(73) Assignee: IFEC B.V., Oud-Beijerland (NL)

( * ) Notice: Subject to any disclaimer, the term of this patent is extended or adjusted under 35 U.S.C. 154(b) by 0 days.

(21) Appl. No.: 19/036,679

(22) Filed: Jan. 24, 2025

(65) Prior Publication Data

US 2025/0241324 A1     Jul. 31, 2025

(30) Foreign Application Priority Data

Jan. 26, 2024    (NL) ...................................... 2036901

(51) Int. Cl.
A22C 21/00          (2006.01)
(52) U.S. Cl.
CPC ................................ A22C 21/0023 (2013.01)
(58) Field of Classification Search
CPC ............ A22C 21/0023; A22C 21/0046; A22C 21/0053; A22C 21/0069
USPC ........................................................ 452/149
See application file for complete search history.

(56) References Cited

U.S. PATENT DOCUMENTS 4,557,017 A * 12/1985 Gasbarro ........... A22C 21/0069
                                                         452/136
4,564,976 A *  1/1986 Beech ................ A22C 21/0023
                                                         452/160
4,688,297 A    8/1987 Bartels
5,954,574 A    9/1999 Verrijp et al.

FOREIGN PATENT DOCUMENTS

EP        0 485 038 A1     5/1992
EP        1 868 443 B1     11/2010

OTHER PUBLICATIONS

International Search Report and English translation of Written Opinion for Dutch Application Serial No. NL 2036901 dated Sep. 3, 2024.
Ifec B.V., "IFEC—Back Meat Harvesting Machine", Jan. 23, 2024, https://www.youtube.com/watch?v_=_y_wDiolprE.

* cited by examiner

*Primary Examiner* — Richard T Price, Jr.
(74) *Attorney, Agent, or Firm* — Heslin Rothenberg Farley & Mesiti P.C.

(57)                    ABSTRACT

The invention relates to a device for removing meat from poultry, in particular for removing poultry back meat from a poultry ribcage of slaughtered poultry. The invention also relates to a poultry carrier for use in said device. The invention further relates to a method for removing meat from poultry, in particular for removing poultry back meat from a poultry ribcage, in particular by using a device according to the invention.

17 Claims, 9 Drawing Sheets

DEVICE AND METHOD FOR REMOVING MEAT FROM POULTRY, AND POULTRY CARRIER

CROSS REFERENCE TO RELATED APPLICATION

This application claims priority under 35 U.S.C. § 119 to Netherlands Patent Application No. 2036901, filed Jan. 26, 2024, which is incorporated herein by reference in its entirety.

FIELD OF THE INVENTION

The invention relates to a device for removing meat from poultry, in particular for removing poultry back meat from a poultry ribcage of slaughtered poultry. The invention also relates to a poultry carrier for use in said device. The invention further relates to a method for removing meat from poultry, in particular for removing poultry back meat from a poultry ribcage, in particular by using a device according to the invention.

BACKGROUND

For slaughtered poultry to be divided into parts which are attractive to the consumer, it is conventional for the poultry to be supplied to a dividing line of a poultry processing plant. In this line the poultry is conveyed by a conveyor which is guided past a number of processing stations. However, in particular for harvesting back meat from a carcass part of slaughtered poultry, the known devices and methods only yield a reduced fraction of the back meat, such as for example two outer fillets, while requiring relatively complicated and/or inefficient, and normally rather expensive, equipment.

SUMMARY

A first objective of the invention is to provide an improved poultry meat harvesting device and method.

A second objective of the invention is to provide an improved poultry back meat harvesting device and method.

A third objective of the invention is to provide a relatively efficient poultry meat, in particular poultry back meat, harvesting device and method.

A fourth objective of the invention is to provide a poultry meat, in particular poultry back meat, harvesting device having a relatively compact and/or efficient design.

At least one of these objectives can be achieved by a device according to the preamble, comprising:

at least one conveyor, in particular an endless conveyor, for transporting pieces of poultry along a transport path;

at least one poultry carrier attached to and/or forming part of said conveyor wherein each poultry carrier is configured to carry and/or support at least one piece of poultry, in particular at least a part of a poultry ribcage with poultry back meat attached to said ribcage, at least one pre-cutting section arranged along the transport path of the conveyor, comprising at least one pre-cutting element positioned such that at least a part the poultry meat is partially separated from a remaining part of the poultry, in particular wherein at least a part of the poultry back meat is partially separated from the poultry ribcage and, at least one meat separation section, arranged downstream of said pre-cutting section along the transport path of the conveyor, comprising at least one rotatable cutting element, for making a separating incision to separate said at least one pre-cut poultry part from said remaining poultry part, in particular to separate said pre-cut poultry back meat entirely from said poultry ribcage. Preferably, said meat separation section is further configured to physically remove said separated poultry part from said remaining poultry part, in particular to physically remove said separated poultry back meat from said poultry ribcage, in at least direction away from the transport path.

Hence, the device according to the invention constitutes a poultry meat, in particular poultry back meat, harvesting device and method for harvesting back meat from a carcass part of slaughtered poultry, in particular chickens. The device according to the invention allows to harvest back meat with a good quality in terms of meat structure and yield, and allows, for example, to separate the practically entire back meat portion as a single outer fillet from the ribcage. This results in larger fillet sizes compared to the prior art, but moreover, leads to an improved yield of the (back) meat harvesting process, and therefore a reduced of meat waste. The device according to the invention may therefore also be considered as a filleting device.

During transportation of the poultry on/by the conveyor along the different processing stations, the poultry is preferably oriented in an upright position, with a breast side down, preferably wherein the spine or back meat is oriented substantially horizontally. Preferably, during the transportation, at least a part of each piece of poultry is located above the conveyor, wherein the conveyor supports at least a part of each piece of poultry. This leads to the situation wherein the back meat portion of the poultry ribcage (poultry carcass) is positioned on top, and that due to underneath positioning of the conveyor a working space is created above and around the back meat portion to accurately separate this back meat portion, in successive steps, from the ribcage. This leads to a less constrained cutting process and therefore allows a more controlled cutting process. Moreover, due to low positioning of the conveyor, the cutting stations, such as the pre-cutting section and the separation section, can be easily installed and positioned, leading to a relatively efficient, and possibly simple device design. The separation section preferably comprises a single rotatable cutting element. Said single rotatable cutting element is preferably axially rotatable about an axis of rotation which virtually intersects the transport path. This implies that the rotatable cutting element defines plane having at least one directional component parallel to the transport path, such as a horizontal component parallel to a horizontal transport path.

The pre-cutting section is preferably configured to make at least one pre-cut in said poultry which extends in a direction parallel to a transport direction of the poultry passing through said pre-cutting section. Preferably, the pre-cutting section comprises a plurality of pre-cutting elements positioned at mutual distance from each other, wherein the mutual distance is preferably larger than 0.5 centimetre, such as larger than 1 centimetre and/or wherein the mutual distance is preferably smaller than 5 centimetre. According to this preferred embodiment, in the pre-cutting section (at least) two incisions are made in the back meat, one on each side of the spine (backbone). At or around the spine, the back meat remains attached to the spine in the pre-cut section, and will be cut (and detached) in the downstream separation section. The width the uncut part of the back meat portion adjacent to the spine is preferably defined by the distance in between opposite, distant pre-cut elements. One or more pre-cutting elements may be, and are preferably, stationary pre-cutting element(s). It is imaginable that at least one pre-cutting element comprises at least one non-linear, such as an angular and/or curved, preferably concavely curved, blade section. This blade section is preferably configured to follow at least a part of an upper side of the ribcage, and hence at least a part of the back meat section. Preferably, at least one pre-cutting element comprises is configured to pre-cut a poultry such that two distant poultry meat flaps are created which are positioned at opposite sides of an uncut part of the poultry, and/or wherein at least one pre-cutting element comprises is configured to pre-cut a poultry back such that two distant poultry back meat flaps are created which are positioned at opposite sides of a spine (backbone) of a poultry ribcage. A third cut is made by the separation section to preferably separate said back meat section as at least one outer fillet (optionally with back meat flaps still attached to each other) from the ribcage. It is imaginable that at least one, preferably each, pre-cutting element is resiliently and/or rotatably attached to the device. Preferably, wherein said pre-cutting element is resiliently pivotable or rotatably around a pivot axis which extends substantially parallel to the transport path. Preferably, the pivot axis is positioned below and/or at a lateral distance with respect to the transport path. Pivoting the pre-cutting element may allow to account for small deviations between the pieces of poultry. For example, not every ribcage has the same dimension. Hence, in case a ribcage is slightly larger, the pre-cutting element may be forced outwardly to account for the larger dimensions. Preferably, the pre-cutting element has an first maximum position, wherein the pre-cutting element is closest to the transport path, preferably which position (or a further inward rotating motion) is physically or mechanically determined and/or bounded. To this end, the pre-cutting section may comprise at least one stopper, for stopping of a rotation of the pre-cutting element in a downward direction. Hence, said stopper defining a resting position of the pre-cutting element(s). The poultry ribcage can move the pre-cutting elements outwardly with respect to the stopper, and upon the ribcage passing the pre-cutting elements causing the pre-cutting elements to resiliently return to the resting position.

Said at least one pre-cutting element is preferably aligned, in particular in height, with the rotatable cutting element of the separation section. Preferably, a highest edge of at least one pre-cutting element is positioned at the same level or at a higher level compared to a cutting location of the rotatable cutting element. This alignment preferably allows a smooth, direct or indirect, connection between the two sections being in favour of the meat cutting process.

In a preferred embodiment, the device further comprises at least one poultry meat product alignment section, arranged in between the pre-cutting section and meat separation section, for aligning the poultry, in particular the at least one pre-cut poultry part, with respect to the rotatable cutting element of the separation section. Such an intermediate section may further facilitate the processing of the poultry on the transport path along the different sections mentioned in this paragraph. Preferably, the alignment section comprises at least one alignment element, preferably at least mutually spaced two alignment elements, to move at least a part of the pre-cut (detached) poultry part away from the remaining poultry part to create at least one space between the pre-cut poultry part and the remaining poultry part. Such one or more spaces will typically facilitate a smooth and accurate cutting process in the downstream separation section. It is imaginable that the at least one alignment element, preferably at least mutually spaced two alignment elements, is configured to lift at least one pre-cut poultry part in a direction away from the remaining poultry part to create said at least one space. It is imaginable that at least one alignment element, preferably each alignment element, is configured as guide bar for guiding the pre-cut poultry part and/or as slide bar for allowing the pre-cut poultry part to slide and/or to be pulled over said slide bar (by the conveyor). Preferably, at least one alignment element is aligned with the rotatable cutting element of the separation section. Preferably, at least a part of a highest edge of at least one alignment element is positioned at the same level or at a higher level compared to a cutting location of the rotatable cutting element. Such an alignment will typically secure a smooth transition of the poultry from the alignment section to the separation section. Preferably, at least a part of a highest edge of at least one alignment element is positioned at substantially the same level or at a lower level compared to the at least one pre-cutting element. This alignment will typically secure a smooth transition of the poultry from the pre-cutting section to the alignment section. The alignment section preferably connects to and/or is positioned directly adjacent to both the pre-cutting section and the separation section and/or any other section of the device. This connection does not imply that the sections are in direct physical contact with each other, but that the sections are positioned close to each other, wherein an optional intermediate gap is for example less than 1 centimetre, preferably less than 0.5 centimetre, more preferably less than 0.3 centimetre. Preferably, a side of the alignment section facing the rotatable cutting element is at least partially concavely curved. The curvature of said curved side of the alignment section preferably substantially corresponds to the curvature of a (circular) circumferential edge of the cutting element of the separation section. The axially rotatable cutting element, such as a cutting disc, of the separation section is configured to realize an incision in horizontal direction and/or in a direction parallel to the transport path.

Preferably, the alignment section comprises two distant alignment elements, which mutually enclose a slotted passage for feed-through of an uncut portion of the poultry, wherein said uncut portion is preferably located in between two cut portions of the poultry. Optionally, at least one further axially rotatable cutting element, such as a cutting disc, is partially positioned in between said alignment element to create an incision, preferably a vertical incision (perpendicular to the transport path), in a back meat portion adjacent to the spine, and hence in between and at a distance from the one or more back meat portions separated by the pre-cutting section. The axis of rotation of this axially rotatable element may be horizontal or slightly tilted. This further incision is optionally used to split the outer fillet into two smaller outer fillets which can be separated from the ribcage in the separation section. Preferably a cutting location of this further axially rotatable cutting element (being the location where the cutting element contact and cuts the meat) is a lowest location of the rotatable cutting element. Preferably, during operation, the rotation direction of this further axially rotatable cutting element at this cutting location is opposite to the transport direction of the poultry, which leads to a relatively efficient cut. Hence, in case this further axially rotatable cutting element is used in the alignment section, the alignment section also fulfils the function of splitting section. It is imaginable that this further axially rotatable cutting element is applied without alignment section and/or is positioned at another location along the transport path, and may as such define a splitting section. Preferably, the splitting section is positioned upstream of the separation section. Preferably, the splitting section is positioned downstream of the pre-cutting section.

Preferably, at least one, more preferably each, axially rotatable cutting element comprises and/or is formed by an axially rotatable disc, wherein a cutting edge, preferably a circular cutting edge, is provided at a circumferential edge of said disc. The axis of rotation of the axially rotatable disc of the separation section is preferably vertical or inclined, preferably with an inclination angle situated in between 40 and 90 degrees, with respect to the transport path, wherein a cutting location of the rotatable disc is preferably a lowest location of the disc. As mentioned above, the cutting location is the location where the disc contacts and cuts the meat. Preferably, the radius of said disc of the separation section is at least 10 centimetre, preferably at least 15 centimetre. This allows the disc to function as support surface for the (back) meat separated from the ribcage. It is imaginable and may even be favourable in case an upper side of said disc is at least partially textured and/or roughened, and/or wherein a peripheral annular portion of said upper side of said disc has a more coarse surface than a centre portion of said upper side of said disc. This leads to a relatively high-frictional peripheral portion of the disc, which may be used force discharging of the cut (back) meat from the cutting disc after separation from the ribcage. Preferably, an upper side of said disc is configured to act as support surface for the separate poultry meat and to subsequently remove the poultry meat from the disc due to a centrifugal force exerted by the disc onto the poultry meat. The discharged (unloaded) back meat may be received and collected into a storage container.

The endless conveyor preferably comprises at least one endless belt. The belt may for example be formed by a chain. Preferably, said endless belt conveyor comprises an upper run and a lower run, wherein intermediate space is defined between the upper run and the lower run, and wherein at least a part of said upper run defines the transport path. Here, said belt conveyor preferably comprises at least one belt return device facilitating transitioning of the endless belt between the lower run and the upper run. Said belt return device preferably comprises at least one guide sprocket, preferably at least one driven guide sprocket and optionally at least one non-driven guide sprocket. The sprocket is typically a toothed or toothless wheel or gear that meshes and/or co-acts with the belt, such as a chain. Additionally or alternatively, the endless conveyor may be formed by a carrousel conveyor, wherein which preferably also comprises at least one belt, but wherein the belt typically defines an annular track, which may be circular or oval or may have any other suitable shape. The belt preferably defines a single plane, which leads to a planar conveyor, although a three-dimensional conveyor track is also imaginable. In the carrousel conveyor, the transport path may extend across the entire or across one or more parts of the conveyor.

The conveyor preferably comprises a plurality of poultry carriers attached, preferably releasable attached, to said at least one endless belt. Preferably, at least one, more preferably each, poultry carrier is configured to carry at least one piece of poultry at a distance from the belt. This facilitates the processing of the poultry, and moreover reduces unnecessary fouling of the belt. Preferably, at least one, preferably each, poultry carrier comprises a base structure mounted to said belt, and at least one poultry carrying structure attached to and erected from said base structure, wherein said poultry carrying structure is preferably configured to hang poultry onto said carrying structure such that the poultry is positioned at a distance from the base structure. At least a part of the base structure and the poultry carrying structure may be integrally connected with each other and may form a single component. At least a part of the assembly of at least a part of the base structure and the carrying structure may, for example, be formed of a thermoplastic material, e.g. by using injection moulding. The base structure optionally comprises a stationary part affixed to the belt, and a rotatory part rotatably affixed to said stationary part along a vertical axis and/or an axis perpendicular to the transport path. This allows axial rotation of the rotatory part and the poultry carrying structure along the conveyor.

At least one, preferably each, poultry carrier preferably comprises at least one insertable body configured to be inserted into a poultry ribcage. The insertable body preferably makes part of the carrying structure. The insertable body is preferably tapered and/or cone-shaped towards an outer end. Preferably, the insertable body is pointed towards its outer end in a direction opposite to a transport direction of the poultry carrier, at least along (at least a part of) the transport path of the conveyor which comes across the pre-cutting section and the separation section. It is commonly preferred that the insertable body comprises a pair of retaining fingers for engaging with an interior part of the poultry. Here, at least one of said retaining fingers is preferably resilient and/or resiliently attached, in particular via a spring leaf, to a remaining part of the poultry carrying structure. Preferably, the at least two retaining fingers are placed at a mutual distance. The retaining fingers are commonly made of metal and/or plastic. Preferably, a part of the upper side of the insertion body and/or an upper side of at least one retaining finger is provided with a relief structure, such as a serrated structure, for increasing grip on an interior side of the poultry.

Preferably, at least one, preferable each, poultry carrier comprises at least one actuatable clamp, said clamp being movable between:

an locking position (or securing position), wherein the actuatable clamp is positioned to secure and/or clamp a part of poultry, preferably an interior part of the poultry, with respect to the poultry carrier; and an unlocking position (or releasing position), wherein the actuatable clamp is positioned such that the poultry is unsecured and/or unclamped allowing unloading of the poultry from the poultry carrier.

This clamp allows the poultry to be secured during processing in the various cutting sections of the device. Preferably, the clamp comprises at least one locking part configured to be moved between said locking position and said unlocking position, and an actuating part, preferably position at a distance from said locking part, configured to be actuated by the device, in particular the conveyor, to cause movement of the locking part between said locking position and said unlocking position. Preferably, the actuatable clamp is pivotally attached to the poultry carrying structure, and preferably extends through said poultry carrying structure. This clamp is also referred to as a swivelling clamp. Preferably, the locking part and the actuating part are positioned at opposite sides of the poultry carrying element. Preferably, at least one, more preferably each, poultry carrier comprises at least one latch, in particular a resilient latch, for locking (and/or unlocking) of the actuatable clamp in at least one of the locking position or unlocking position. Preferably, the device is configured such that the actuatable clamp is, preferably secured, in the locking position during transport of the poultry along an optional preparation section, and/or the pre-cutting section, and/or the optional alignment section, and/or the separating section.

As mentioned above, it may be preferred that at least a part of at least one poultry carrier is rotatable with respect to the conveyor, preferably about an axis of rotation which is perpendicular to the transport path. This allows the poultry to be selectively aligned, and optionally differently aligned, with respect to successive processing sections. Preferably, at least a part of at least one poultry carrier is configured to be intermittently rotated by the device, in particular the conveyor. Preferably, at least one, preferably each, poultry carrier comprises an axially rotatable base structure mounted to said belt, and at least one poultry carrying structure attached to and erected from said base structure, wherein the base structure acts as driven wheel, in particular a square drive wheel, and wherein the device, in particular the conveyor, comprises at least one drive cam, such as a pin, preferably a stationary pin, configured to co-act with and consequently to rotate the driven wheel once the driven wheel passes said drive cam. More preferably, the driven wheel comprises a plurality of n slots, wherein n is preferably 4, configured to successively engage with the drive cam to rotate (at least a part of) the base structure over an angle of 360/n degrees. For example, in case the driven wheel comprises 4 slots, each rotation of the base structure (or at least a part of the base structure) about 90 degrees. The driven wheel is preferably a substantially square drive wheel. Preferably, each slot connects to a corner of said square driven wheel and extends towards the axis of rotation of said square driven wheel. This construction comprising a substantially square driven wheel having four slots is also known as a Maltese cross drive. Hence, preferably, the device comprises at least one Maltese cross drive to intermittently rotate at least a part of the poultry carrier.

This rotation possibility of the poultry carrier is preferably used to rotate the poultry carrier upstream of the pre-cutting section, such that the poultry (including its spine) is oriented facing in a direction in line with or opposite to the transport direction. Preferably, the device is configured to rotate the poultry carrier upstream of a preparation section. This preparation section may be used to apply one or more preparatory cuts to the ribcage as will be described in more detail below. The device is preferably configured to rotate the poultry carrier upstream of a loading section and/or upstream of an unloading section to facilitate loading, optionally manual loading, of poultry onto the poultry carriers, and/or to facilitate unloading of the remaining poultry after removal of the meat, in particular the back meat, in the separation section. This unloading section of the device (if applied), is preferably arranged downstream of the meat separation section, and preferably comprises at least one unloading element, for removing the remaining poultry part, in particular the poultry ribcage, from the poultry carrier. Said unloading element may comprise and/or be formed by at least one, preferably stationary, scraping element to mechanically remove, in particular slide, the remaining poultry part, in particular the poultry ribcage, from the poultry carrier. The removed poultry part can be received and collected in an ribcage receiving container.

As indicated above, the device preferably comprises at least one preparation section, arranged upstream of the pre-cutting section along the transport path, said preparation section comprising at least one cutting element, preferably a horizontally mounted cutting element, wherein said cutting element is positioned for making at least one incision between the chest bone and the spine of a poultry carried on a poultry carrier. Preferably, the preparation section, in particular the cutting element thereof, is configured and positioned to cut at least one bone, in particular a coracoid, more in particular the left coracoid and right coracoid, in proximity of the spine of the ribcage (carcass). However, if the poultry ribcage, in addition to the coracoid, still comprises the clavicle(s) or furcula (often referred to as wishbone), it is imaginable that the preparation section also cut said bone in addition to the coracoid bone. Preferably, said the cutting element of the preparation section is a circular axially rotatable cutting element, wherein preferably a plurality of notches and/or teeth are provided along a circumference edge of said cutting element. Said cutting element is preferably rotatable about an axis which is perpendicular to the transport path (running along the preparation section). The preparation section is preferably situated laterally with respect to the conveyor, and wherein the device is configured to rotate the poultry carrier and/or poultry carried by said poultry carrier, towards the preparation section, at least when the poultry carrier passes along the preparation section. By cutting this bone, it may be achieved that any tendons or muscles which cannot be reached (easily) by the pre-cutting element and/or separation section car detached. Otherwise, it may cause the back meat to not be fully separated since one or more tendons or muscles in the coracoid region may still be intact. This is particularly since some of the tendons and muscles of the coracoid(s) extend inwardly towards an interior side of the ribcage which cannot be accessed easily by the pre-cutting section without cutting through the entire ribcage, the latter option being less favoured since this may cause bone splints to end up or be shattered through the back meat. Some examples of the tendons and muscles cut by the preparation section may be the supracoracoideus muscle, however, optionally also part of the pectoralis muscle, if attached. This may further, and optionally allow the present invention to harvest the back meat of the poultry, including the front halves.

In an embodiment of the device according to the invention, an upstream end of at least one pre-cutting element is narrower compared to a downstream end. This allows the pre-cutting element to separate the detached (back) meat part from the ribcage during displacement along the pre-cutting element, which is favourable for further processing in, for example, the separation section.

It is commonly favourable in case the device comprises at least one counterpressure section, said counter pressure section comprising at least one counterpressure element arranged along the transport path in proximity of and/or overlapping with, an upstream part of the pre-cutting element, arranged at a side of the pre-cutting element facing away from the conveyor. Here, at least one counter pressure element may be formed by a roller and/or a belt. Each roller and/or each belt may have a profiled and/or textured outer surface to increase grip on the passing poultry. It is imaginable that said roller and/or belt is non-driven. Preferably, each roller and/or each belt is movable, and more preferably configured to move along with passing poultry. It may be preferred that said roller and/or belt is driven, wherein the driving speed is preferably synchronized with the driving speed of the conveyor. Preferably, the conveyor is an endless conveyor having a supplying portion for supplying of poultry to be processed. This supplying portion may also be considered as loading section.

Each driven component may be driven be a drive motor, such as an electric drive motor, of the device. It is imaginable different components are driven by different drive motors. Additionally or alternatively, it is also imaginable that different components are driven by the same (share) drive motor. Preferably, the device and/or at least one drive motor is configured to operate continuously.

The invention also relates to a poultry carrier for use in a device according to the invention. Embodiments and advantages of the poultry carrier have been described above already and will be described below in an extensive manner.

The invention further relates to a method for removing meat from poultry, in particular for removing poultry back meat from a poultry ribcage, in particular by making use of the device according to the invention, comprising the steps of:

A) loading at least one poultry carrier with at least one piece of poultry, in particular a poultry ribcage with poultry back meat attached to said ribcage, B) conveying said loaded poultry carrier at least along a pre-cutting section and a separation section, wherein:

i. in the pre-cutting section, at least a part the poultry meat is partially separated from a remaining part of the poultry, in particular wherein at least a part of the poultry back meat is partially separated from the poultry ribcage, by at least one pre-cutting element, and wherein ii. in the separation section, at least one separating incision is made by at least one rotatable cutting element to separate said at least one pre-cut poultry part from said remaining poultry part, in particular to separate said pre-cut poultry back meat entirely from said poultry ribcage, C) removing said separated poultry part from said remaining poultry part, in particular removing said separated poultry back meat from said poultry ribcage, in at least direction away from the transport path, wherein said separated poultry part is preferably unloaded from the device, and D) unloading the remaining poultry part from the poultry carrier.

Further embodiments of the method according to the invention and advantages thereof have been described above already and will be described below in an extensive manner.

BRIEF DESCRIPTION OF THE DRAWINGS

The present invention will hereinafter be further elucidated based on the following non-limitative figures, wherein.

DETAILED DESCRIPTION

Figure 1:
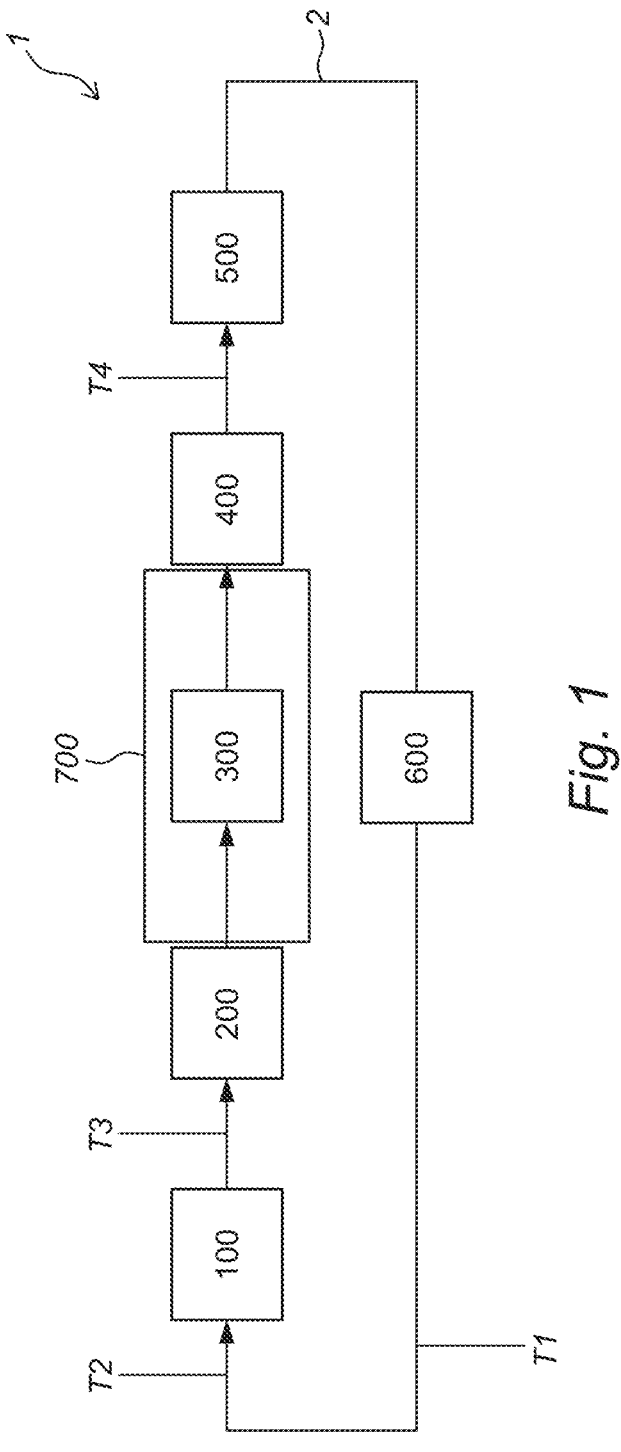
FIG. 1 shows a schematical overview of the device, in terms of functional steps.

FIG. 1 depicts a schematical overview of the device 1 according to a non-limitative embodiment of the present invention. The device comprising a conveyor 2, which in this instance is an endless conveyor 2, for transporting of one or more poultry-carriers (not depicted) along the various processing sections 100, 200, 300, 400, 500, 600, 700. When the meat is transported along the processing sections 100, 200, 300, 400, 500, 600, 700 various processing steps may be performed and/or guided. Preferably, said processing steps are performed in the depicted order along the transport path formed by the conveyor 2. Starting at point T1, which depicts an optional rotation-point of the poultry-carrier along the transport path. Rotating the poultry carrier carrying a poultry ribcage may be beneficial, or even needed, for processing steps, in particular a primary processing step 100. Preferably, a second point T2 depicts the activation of a clamping mechanism (not shown in this figure) of the poultry-carrier, in order to clamp the poultry ribcage to the poultry-carrier. Preferably, the primary processing section 100 is formed by a preparation section 100, for preparing the poultry ribcage for downstream processing steps, said preparation section 100 is shown in more detail in FIG. 2 and FIG. 3. Said preparation section 100 may comprise at least one cutting element for cutting of at least a portion of the poultry ribcage, preferably for cutting a coracoid bone of a piece of poultry, particularly a chicken. Optionally, said cutting element is arranged for cutting both a coracoid bone and a clavicle bone, preferably in proximity of the poultry spine. After the preparation section 100, the poultry-carrier is rotated at point T3. Preferably, the rotation of the poultry carrier is such that the piece of poultry carried on the carrier is oriented in an upstream facing direction prior to entering the pre-cutting section 200 of the device. Said pre-cutting section 200, which is depicted in more detail in FIG. 4, FIG. 5, and FIG. 6, comprises at least one pre-cutting element. Said pre-cutting section 200 is arranged for making an incision in the piece of poultry such that a part of the poultry meat, in particular back meat, is partially separated from the remaining part of poultry. Preferably, the pre-cutting section 200 comprises at least one pre-cutting element which is configured to pre-cut a poultry such that two poultry meat flaps are created which are positioned at opposite sides of an uncut part of the poultry, and/or wherein at least one pre-cutting element comprises is configured to pre-cut a poultry back such that two poultry back meat flaps are created which are positioned at opposite sides of a backbone of a poultry ribcage. Optionally, the device 1 comprises an alignment section 700, for allowing the pre-cut piece of poultry to be aligned in a predefined orientation for a subsequent processing step. Said alignment section 700 may in particular allow for alignment of the pre-cut flaps of back meat. Optionally, at least one optional splitting section 300 is arranged. In particular downstream of the pre-cutting section, and in particular parallel or overlapping at least partially with the alignment section 700. Said splitting section comprising at least one cutting element for making of at least one incision in the pre-cut piece of poultry. In particular, said cutting element of the splitting section 300 being arranged for cutting in a direction parallel to a poultry spine. The splitting section 300 may also form part of the alignment section. Preferably, said cutting element is arranged for cutting in a piece of meat of the poultry back that is attached to the ribcage, in particular between the aforementioned two separated flaps. This splitting section 300 is completely optional, but may allow the device 1 to remove two pieces of meat from the poultry ribcage. After pre-cutting 200 and the optional alignment 700 and optional splitting 300, the device 1 comprises a meat separation section 400, which comprises, at least in this embodiment, a rotatable cutting element, for making of a separating incision to separate the at least one pre-cut poultry part from said remaining poultry part, in particular to separate said pre-cut poultry back meat entirely from said poultry ribcage. The separation section, in particular a cutting element thereof, is further configured to physically remove said separated poultry part from said remaining poultry part, in particular to physically remove said separated poultry back meat from said poultry ribcage, the partially separated meat product from the poultry, and discharging the separated meat product in at least direction away from the transport path. Preferably, after the piece of meat has been removed from the poultry, the actuatable clamp that was activated at point T2 is released at point T4. Preferably, after releasing the actuatable clamp at T4, the device 1 comprises a unloading section 500, for discharging of the processed piece of poultry from the poultry carrier. Preferably, the emptied poultry carriers are transported along a returning section of the conveyor 2 and provided with a new, unprocessed, piece of poultry at a loading section 600.

Figure 2:
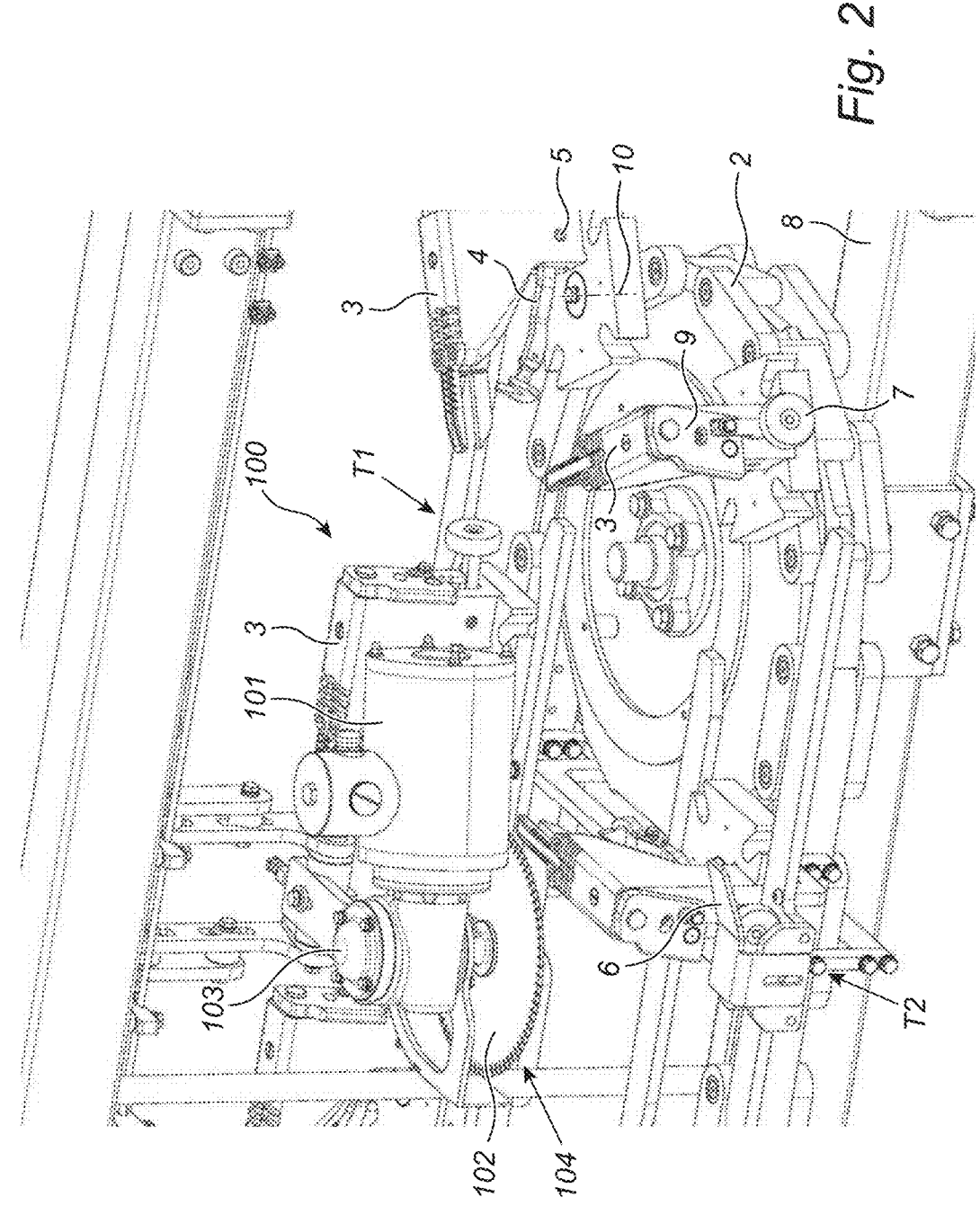
FIG. 2 shows a first detailed view of a preparation section of the device.

FIG. 2 shows a detailed view of the preparation section 100 of the device 1. This figure schematically depicts the first point T1, where the poultry-carrier 3 is rotated around a vertical rotational axis 10 of the poultry-carrier 3, such that a frontal side of the meat carrier is facing in an inward direction of the conveyor 2. The conveyor 2 is formed by a plurality of shackles to which the poultry-carriers 3 are rotatably attached. The rotation T1 of the poultry carriers 3 is arranged upstream of the preparation section 100 and allows for orienting a poultry carried on a poultry carrier 3 with respect to the preparation section 100. The preparation section 100 as shown in this embodiment comprises a substantially horizontal cutting element 102. Said cutting element 102 being rotatable around a vertical axis of rotation 103, The cutting element 102 shown in this embodiment is driven by at least one motor 101, in particular being an electro motor 101. Said cutting element 102 comprises a plurality of cutting teeth 104, which contributes to cutting of one or more bones of the piece of poultry. In particular said cutting element 102 is oriented such as to cut one or more coracoid bones of a piece of poultry transported along said cutting element 102 by a poultry-carrier 3, which is shown in more detail in FIG. 3. Prior to passing along the preparation section 100 of the device, the poultry-carrier 3 is transported along point T2. At this point T2 an activator 6 is arranged, for activating of the actuatable clamp 4 of the poultry-carrier. Said activator 6 is arranged for activating the clamping element 4 into a clamping position, which may alternatively be referred to as locking position, for clamping of a piece of poultry on the carrier 3. After the clamping element 4 is positioned in the clamping position, or the locked position, the piece of poultry carried by a poultry carrier 3 may be stabilised in order to prevent that one of the cutting elements of the devices removes or displaces said piece of poultry. The activator 6 shown in this embodiment is a static activator 6 which may form part of a frame 8 of the device, at least arranged stationary with respect to the moving conveyor 2. The activator 6 co-acts with an activating element 7 of the clamping element 4. The clamping element 4 is pivotally attached to the poultry carrier 3 around a pivot point 5. Said activating element 7 may co-act with the activator 6 by means of a guiding action of the activator 6, gradually forcing said activating element to pivot the clamping element 4 around the pivot point 5. The poultry-carrier 3 preferably comprises a locking latch 9 for locking of the clamping element 4 in a clamping position. Said locking latch 9 may be activated upon a predetermined rotation of the clamping element 4.

Figure 3:
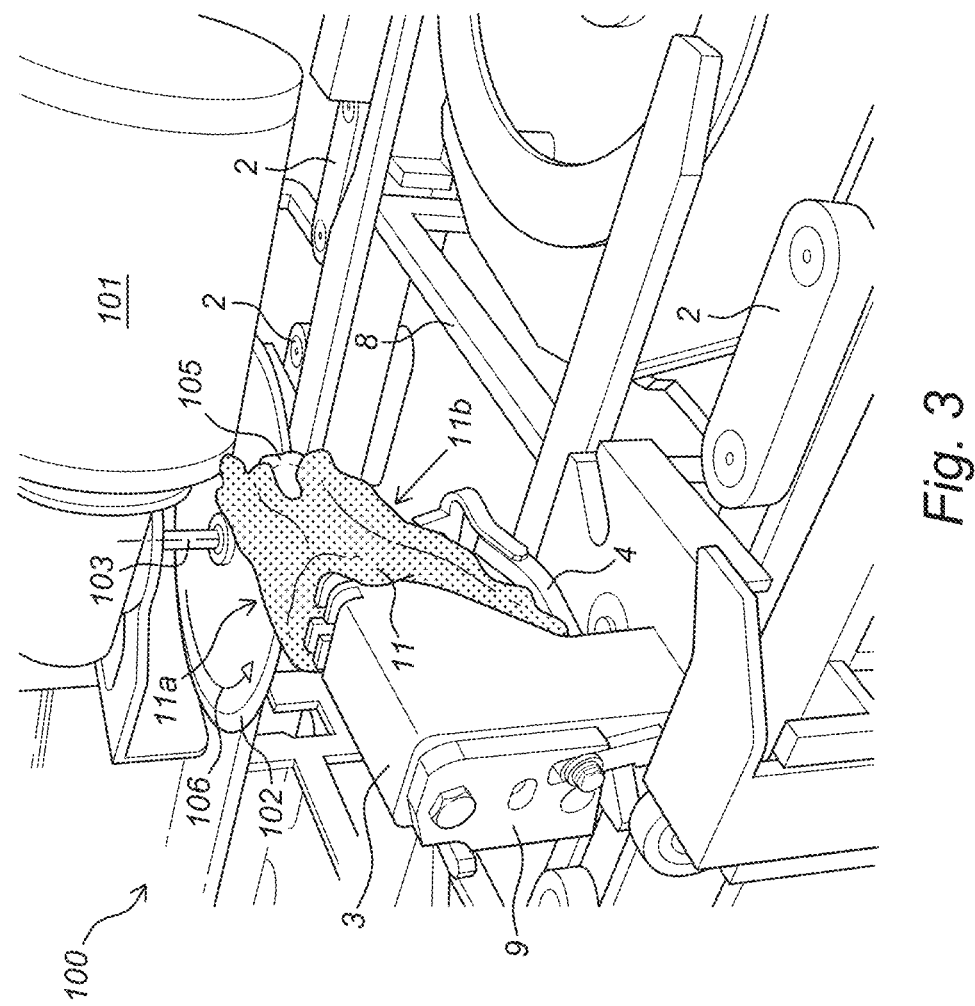
FIG. 3 shows a detailed perspective view of the preparation section shown in FIG. 2.

FIG. 3 shows a detailed perspective view of a part of the preparation section 100 shown in FIG. 2. This figure provides a representation of a piece of poultry 11 that is carried on a carrier 3. The piece of poultry comprises an upper side 11a and a lower side 11b. The upper side 11a normally carrying the back meat of the ribcage 11, the lower side 11b being the side to which the breast is attached. As can be seen, the carrier is shaped such that the upper side 11a of the poultry is carried substantially horizontally by the carrier 3. This allows for more efficient processing of the piece of poultry 11. In this figure, the clamping element 4 is positioned and locked, by the locking latch 9, in the clamping position, pressing the poultry 11 against the carrier 3. The cutting element 102 of the preparation section 100 is positioned such as to cut through a (schematically indicated) coracoid bone 105 of the piece of poultry 11. This allows for (subsequent) removal of the back meat. The cutting element 102 is positioned such as to cut the coracoid bone 105 in proximity of the spine of the poultry 11.

Figure 4:
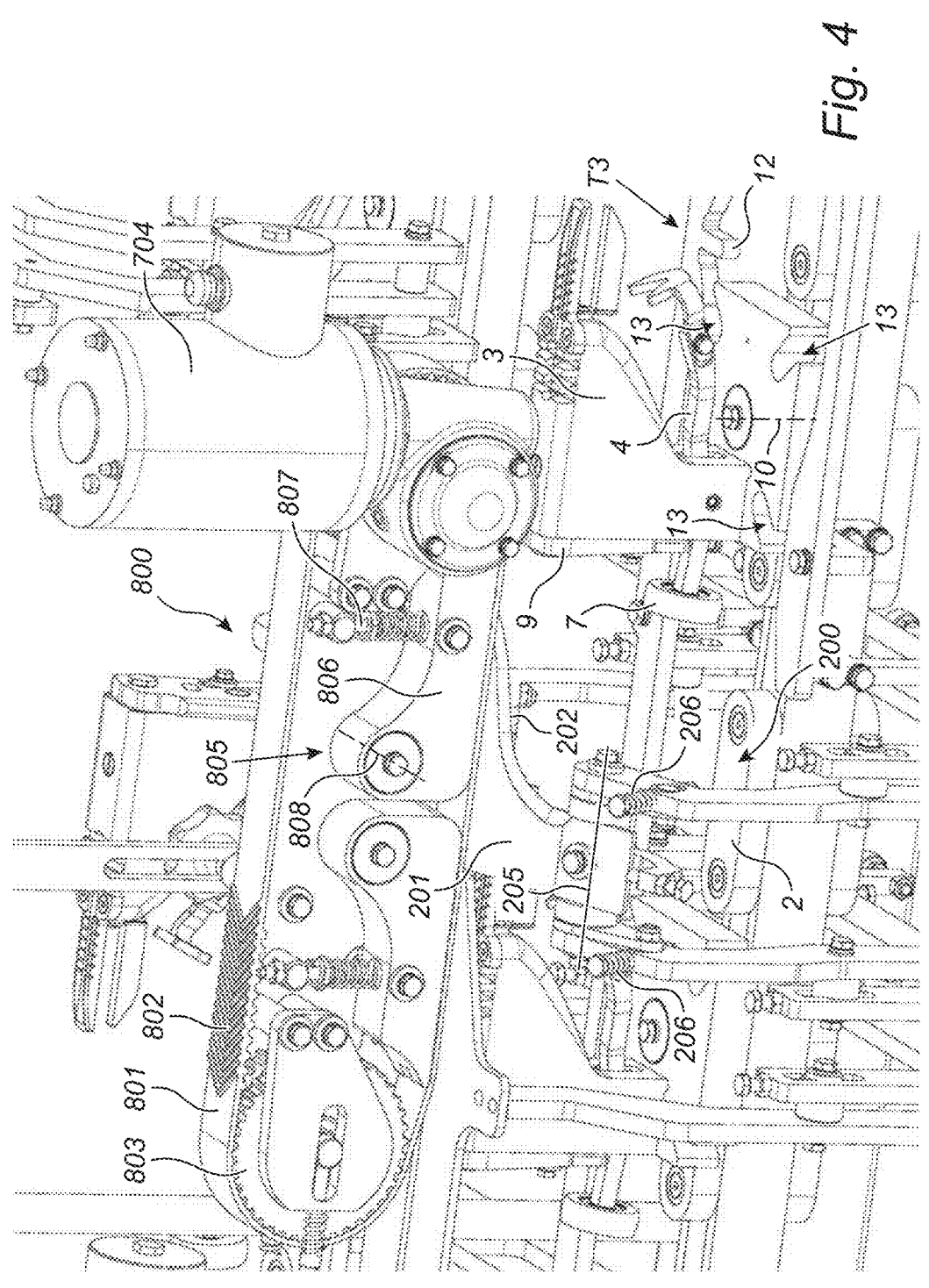
FIG. 4 shows a second detailed view of a part of the device according to the present invention.

FIG. 4 shows a subsequent processing step of the pre-cutting section 200. Prior to entering the pre-cutting section 200 the meat carrier 3 is rotated around the rotational axis 10 such as to orient a piece of poultry in an upstream direction. The poultry-carrier 3 is configured to rotate around its rotational axis 10 by means of a co-acting rotation elements 12, 13. Said co-acting rotation elements 12, 13 allow the poultry-carrier to be rotated at point T3, which is positioned just upstream with respect to the pre-cutting section 200. The co-acting rotation elements 12, 13 are formed by a protrusion 12 and a recess 13, wherein at least one of the protrusion 12 or recess 13 is statically positioned along the transport path. In the embodiment depicted, the protrusion 12 is arranged along the transport path such that a poultry-carrier 3 moving along said protrusion causes a rotation thereof. The pre-cutting section 200 comprises at least one cutting element 201 said cutting element 201 arranged for making an incision in a piece of poultry. An upstream side 202 of the pre-cutting element 201 is substantially non-linear, in particular angular and/or partially curved. The pre-cut incision will be elaborated in more detail with respect to FIG. 5. In order to further assure an accurate incision placement of the pre-cutting section 200 a counter-pressure section 800 is arranged at a distance with respect to the pre-cutting section 200. The counterpressure section 800 is arranged at a distance, in a direction facing away from the pre-cutting element, from the pre-cutting element 201. The counterpressure section 800 is preferably positioned such as to at last partially press the poultry carried on the poultry carrier 3. The counterpressure section 800 in this particular embodiment is formed by a driven belt 801, wherein said belt 801 is arranged around a pair of drive wheels 803, for driving said belt. To this end the drive wheels 803 may comprise teeth, for co-action with teeth on an inner side of the drive belt 801. Preferably, at least one drive wheel 803 is driven, in particular by a drive motor 804. It is conceivable that the drive belt 801 comprises one or more relief sections 802. Said relief sections may be positioned such that at least one relief section 802 is aligned with a part of the poultry-carrier 3. Preferably, the relief section 802 is configured to contact an exterior side of a part of the back meat of the poultry ribcage in order to guide and/or align a part of the back meat with the pre-cutting section 200. In the embodiment shown in this figure, a guiding portion 805 is arranged in an interior of the driven belt 802. The guiding portion 805 is formed by a guiding body 806, wherein said guiding body 806 is pivotally attached around a pivot axis 808. A part of the guiding body 806, at a distance from said pivot axis 808, is resilient 807 in a direction towards the cutting section 200. This may ensure that an exterior side of the belt 801 remains in contact with the poultry back meat at least during transport through the pre-cutting section 200. It is imaginable that at least one, preferably each, pre-cutting element is resiliently pivotable around a pivot axis 205 which extends substantially parallel to the transport path. Preferably, the pivot axis 205 is positioned below and/or at a lateral distance with respect to the transport path. Pivoting the pre-cutting element 201 may allow to account for small deviations between the pieces of poultry. For example, not every ribcage has the same dimension. Hence, in case a ribcage is slightly larger, the pre-cutting element 201 may be forced outwardly to account for the larger dimensions. Preferably, the pre-cutting element has an first maximum position, wherein the pre-cutting element is closest to the transport path, preferably which position (or a further inward rotating motion) is physically or mechanically determined and/or bounded. To this end, the pre-cutting section 200 may comprise at least one stopper (not visible), for stopping of a rotation of the pre-cutting element 201 in a downward direction. Hence, said stopper defining a resting position of the pre-cutting element(s) 201. The poultry ribcage can move the pre-cutting elements 201 outwardly with respect to the stopper, and upon the ribcage passing the pre-cutting elements causing the pre-cutting elements to resiliently return (e.g., via springs 206) to the resting position.

Figure 5:
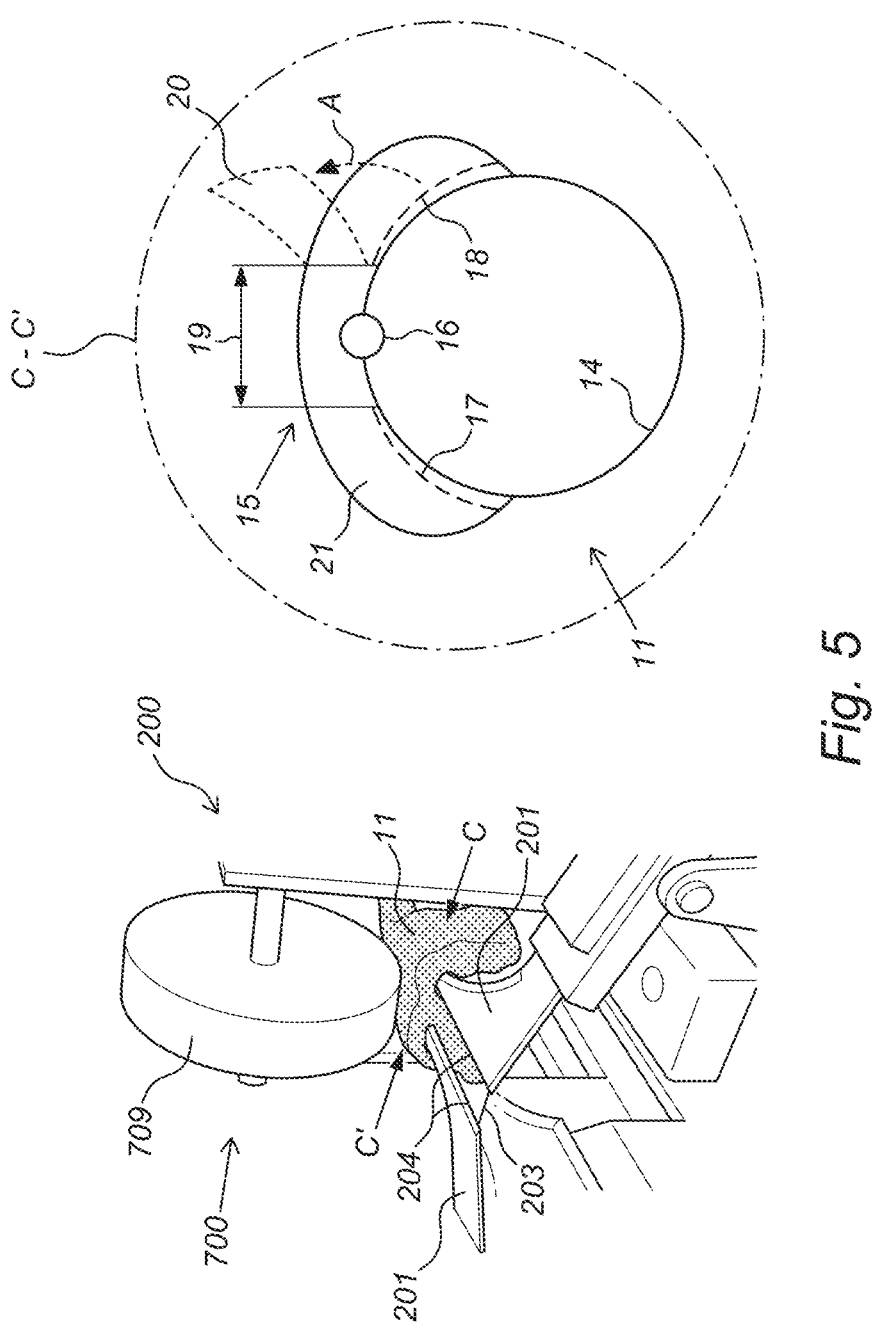
FIG. 5 shows an embodiment of at least one pre-cutting section.

FIG. 5 shows a detailed example of a cutting section 200 according to an embodiment of the present invention. The figure further depicts an embodiment of the counterpressure section 800 according to the present invention. The counterpressure section 800 in this embodiment is formed by a single counterpressure roller 809. Said roller being positioned in alignment with the pre-cutting section 200, in particular a upstream end of the cutting elements 201. The different embodiments of the counterpressure section 800 may be used interchangeably. In the non-limitative embodiment depicted in this figure, the pre-cutting section 200 comprises a pair of pre-cutting elements 201, which are positioned at a mutual distance from each other 203. The distance is preferably larger than about 1 cm, and/or wherein said distance is smaller than 5 centimetre. The pair of pre-cutting elements 201 are arranged for making a cut in the poultry which extends at least partially parallel to a transport direction. In this embodiment, mutually facing edges 204 of the pre-cutting elements 201 are substantially parallel. This allows for convenient passage of a piece of poultry 11 through the space 203 between the cutting elements 201. FIG. 5 further shows a schematical cross sectional view C-C' of a pre-cut piece of poultry 11. The cross-sectional representation of the poultry 11 shows the spine 19 of the poultry, to which the ribcage 14 is attached. On a back side of the poultry 11 a piece of back meat 15 is (partially) attached. The pre-cutting elements 201 shown in this figure are arranged for each making an incision 17, 18 in the back meat 15. Said incision preferably follows the shape of the ribcage 14. Due to the cutting elements 201 being mutually spaced apart, a part 19 of the back meat remains attached to the poultry 11, in particular to an outward side of the ribcage 14. The incisions 17, 18, made by the pre-cutting elements 201 form two distant flaps 20, 21 in the back meat 15 are created.

Figure 6:
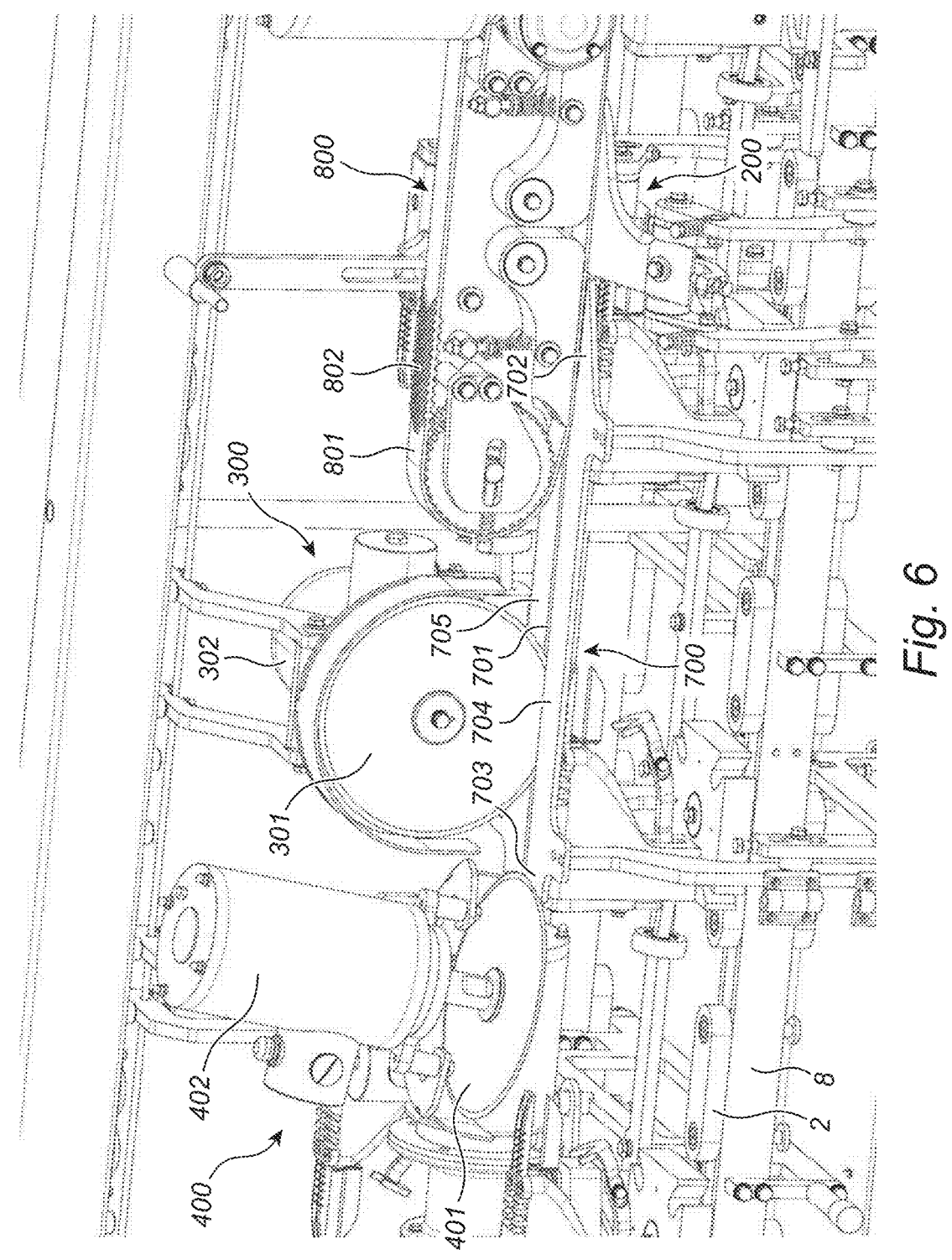
FIG. 6 shows a detailed view of a further part of the device according to the present invention.

FIG. 6 shows a detailed view of a further part of the device according to the present invention. This figure depicts, in order from upstream to downstream, the pre-cutting section 200, the counterpressure section 800, the alignment section 700, a splitting section 300 and a separation section 400. The details in respect of the pre-cutting section 200 and counterpressure section 800 as elaborated above, apply similarly to this figure. In this embodiment, the separation section 800 is positioned at a distance from the pre-cutting section 200. In order to provide for a proper alignment of the piece of meat, an alignment section 700 is arranged between the pre-cutting section 200 and the downstream separation section 400. Said alignment section 400 is arranged directly adjacent to said pre-cutting section 200 and separation section 400 and allows for aligning of the pre-cut poultry part with respect to a rotatable cutting element 401 of the separation section 400. In the depicted embodiment, the alignment section 700 comprises a pair of mutually spaced apart alignment elements 705, said alignment elements being arranged at a predetermined distance 701 with respect to each other. The alignment elements 705 are configured to move a part of the pre-cut poultry part (such as a meat flap) in a direction away from the remaining poultry part. Particularly to lift said pre-cut meat flap such as to create a space between the meat flap and the remaining poultry part. In the embodiment depicted in this figure, said alignment parts are formed by a guide bar 705 or slide bar 705 along which a pre-cut poultry part is slid, or pulled in a direction towards the separation section 400. Preferably, the alignment elements 705 are aligned with the position of the rotatable cutting element 401 of the separation section 400. In order to allow an efficient separation of the pre-cut poultry, it may be preferred that at least a part of a highest edge of at least one alignment element 705 is positioned at the same level or at a higher level compared to a cutting location of the rotatable cutting element 401. Preferably, a downstream edge or side 703 of at least one alignment element 705 is at least partially shaped in conformity with the rotatable cutting element 401, preferably, said side is at least partially concavely curved. Hence, the downstream edge 703 of the alignment elements 705 is preferably directly adjacent to the rotatable cutting element 401. An upstream end 702 of the alignment elements 705 may be substantially tapered, which may contribute to directly conveying the pre-cut poultry to the alignment section 700. The rotatable cutting element 401 is positioned at an angle with respect to the horizontal plane. The rotatable cutting element 401 is preferably driven by at least one motor 402 such as an electro motor 402.

Figure 7:
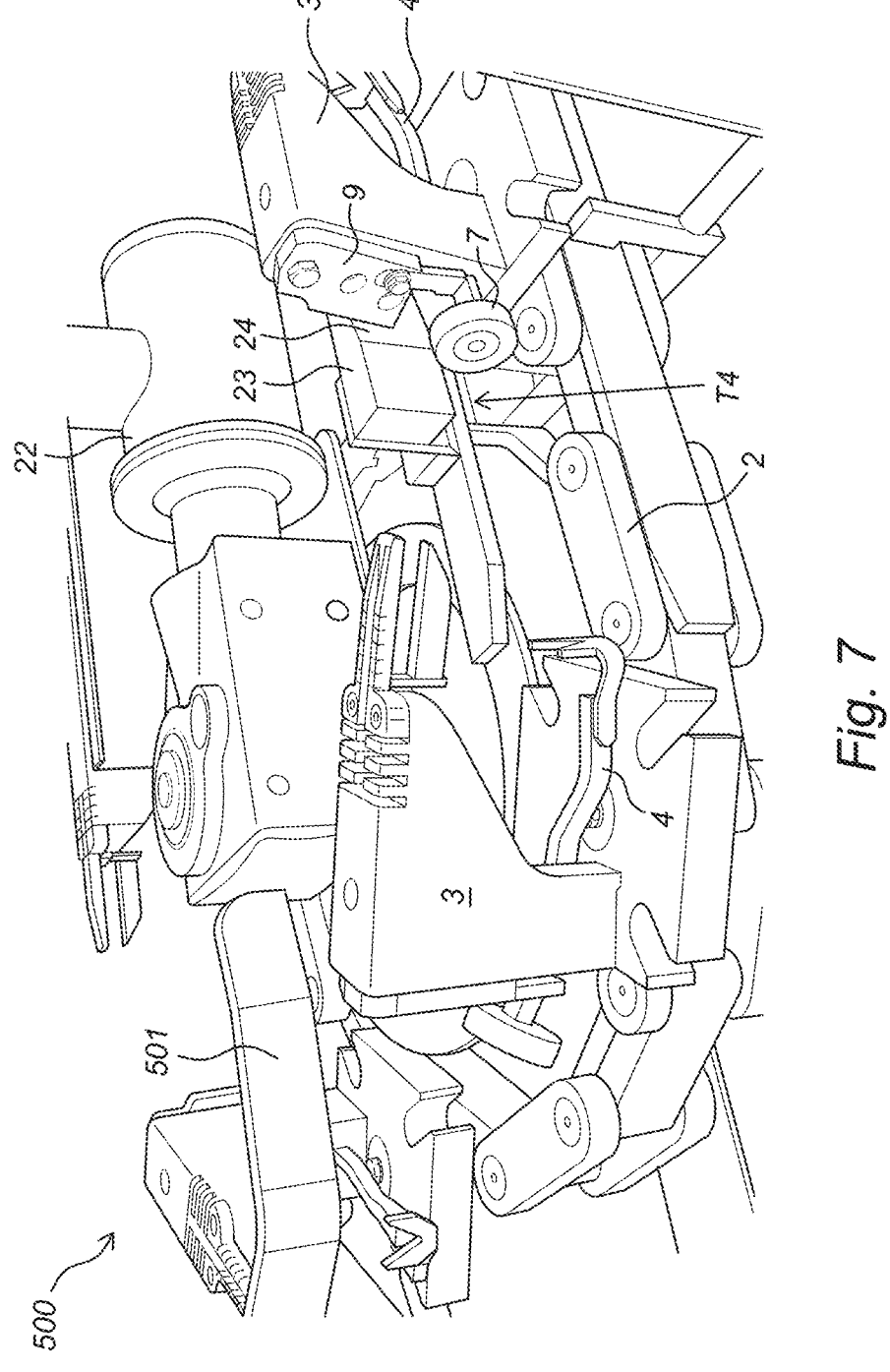
FIG. 7 shows a detailed view of a part of the unloading section of the present invention.

FIG. 7 shows a detailed view of a part of the unloading section 500 according to a non-limitative embodiment of the present invention. Prior to arriving at the unloading section 500, the poultry-carrier, in particular the clamping element 4 needs to be released from clamping the poultry, in particular the ribcage, to the poultry-carrier 3. To this end, at a location upstream of the unloading section 500, the device comprises a release element 23, located at point T4 along the transport path. The release element 23 is configured to release the clamping element 4 such that the clamping element 4 is in a non-clamping position. To this end, the release element 23 is configured to co-act with the locking latch 9 of the poultry-carrier 3. The release element 23 comprises a release surface 24, which is at least partially placed in the transport path, such as to abut against a part of the locking latch 9. In particular the release surface is positioned such as to rotate the locking latch 9. Rotation of the locking latch 9 causes a protrusion 9A of the locking latch to be displaced from a locking position, in which it prevents movement of the clamping element, into a release position in which it allows a movement of said clamping element 4 into a non-clamping position. Downstream of the release position T4, the unloading section 500 is arranged. The unloading section may remove a processed piece of poultry, in particular a processed poultry ribcage, from the poultry-carrier 3. In this embodiment, the unloading section 500 comprises at least one scraping element 501, for mechanical removal of the processed poultry part. The mechanical scraping element 501 is a stationary element, attached to a part of the frame of the device. Once the processed piece of poultry is removed by the unloading element or scraping element 501, the poultry-carrier can be provided with a new, to be processed, piece of poultry.

Figures 8A, 8B:
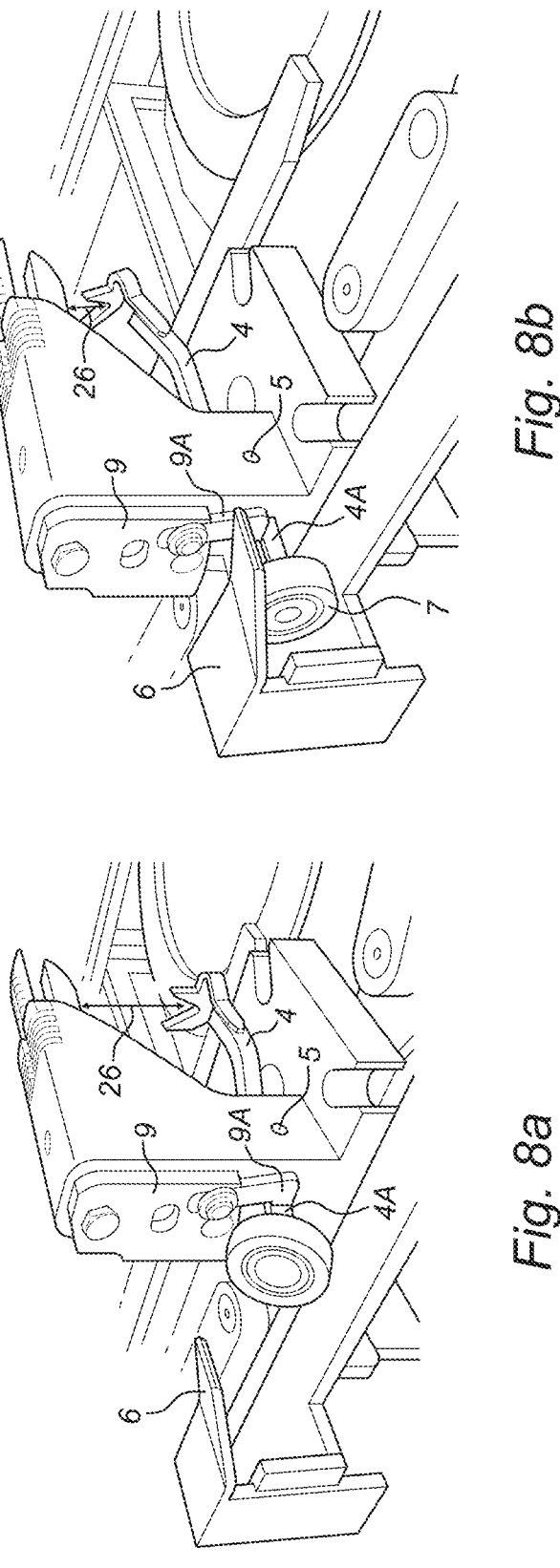
FIGS. 8*a* and 8*b* show two positions of a poultry-carrier according to the present invention.

FIGS. 8a and 8b further show the clamping (8b) and non-clamping (8a) position of the clamping element 4 respectively. In the clamping position (FIG. 8b) a distance 26 between a clamping end of the clamping element 4 is positioned closer to the poultry-carrier 3 such as to clamp a piece of poultry. Contrary, in the non-clamping position (FIG. 8a) a distance 26 between a clamping end of the actuatable clamp 4 is positioned further away to the poultry-carrier 3 such as to release a piece of poultry. In the clamping position indicated in FIG. 8b the actuatable 4 is locked by the locking latch 9. In particular, a locking part 9A of the locking latch 9 is positioned to block a part 4A of the actuatable clamp 4. In particular, said locking part 9A prevents a releasing motion of the part 4A of the actuatable clamp 4. As can be seen in the no-clamping position in FIG. 8a, the locking part 9A of the locking latch 9 does not prevent a releasing motion of the part 4A of the actuatable clamp. By pivoting the actuatable clamp 4 towards its clamping position (hence from position as shown in FIG. 8a to the position shown in FIG. 8b) the locking part 9A of the locking latch 9 automatically moves in the rotational path of the actuatable clamp 4 such as to prevent a returning movement of the actuatable clamp.

Figure 9:
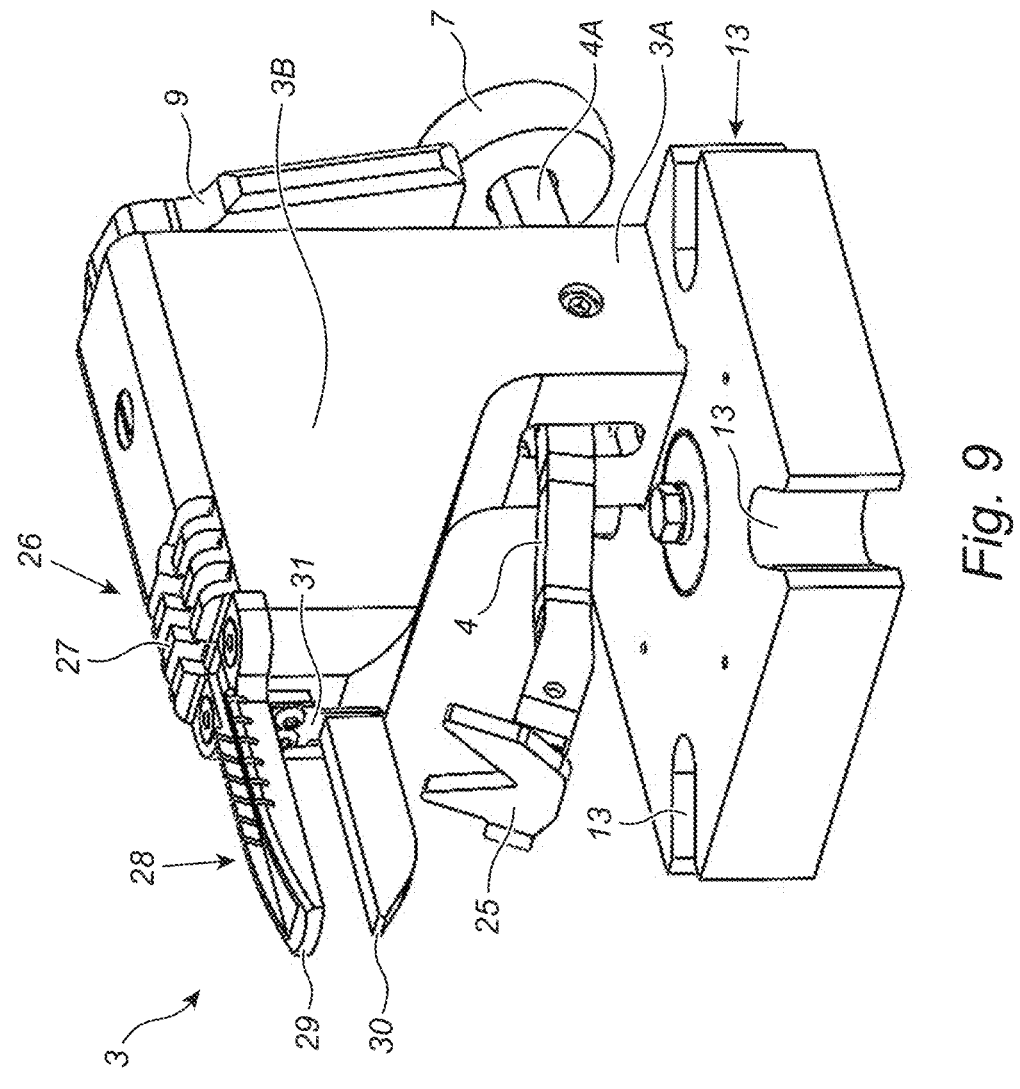
FIG. 9 shows a poultry-carrier according to the present invention.

FIG. 9 shows a poultry-carrier according to a different aspect of the present invention. Although the poultry-carrier 3 may be used for transporting of a poultry carcass in the present invention, it is conceivable that the poultry-carrier 3 and its aspect may be separately applied, independent of the device as described. The poultry carrier 3 as shown in this non-limitative embodiment comprises a base structure 3A which is attachable or mounted to the belt of a conveyor. Preferably, said base structure 3A is rotatably attached to a conveyor, wherein at least said base 3A is rotatable around a vertical rotational axis 10. The poultry carrier 3, in addition to the base structure 3A preferably comprises a poultry carrying structure 3B, configured to hang poultry onto said carrying structure 3, such that poultry is positioned at a distance from the base structure 3A. The poultry carrier 3, in particular the carrying structure 3B comprises at least one insertable body 36, which may be inserted into a poultry ribcage. Said insertable body 26 is in particular tapered towards one end, in particular an outward end. The tapering of the insertable body 26 may be substantially similar to the (average) tapering of a poultry ribcage. In order to increase the grip on an (interior side) of a poultry ribcage, the insertable body 26 comprises a relief structure 27, wherein said relief is applied at a side of the insertable body 26 facing away from the base structure 3A. The relief structure 27 may also be referred to as a serrated structure. Ideally, the relief structure 27 may accommodate one or more ribs of the ribcage in order to partially suppress sliding of the ribcage. Moreover, the insertable body 26 may comprise a pair of retaining fingers 29, 30, for engaging with an interior part of the poultry. Said at least two retaining fingers 29, 30 are placed at a mutual distance with respect to each other. This may allow a cutting element to pass through said retaining fingers during a processing action to the poultry ribcage. In order to increase functionality of the retaining fingers 29, 30 it was surprisingly found that making at least one retaining finger resilient and/or mounting at least one finger resiliently to the insertable body 26 significantly increased the grip to the poultry ribcage. In this embodiment, a bottom retaining finger 30 is resiliently mounted to the insertable body 26. The resilient mount 31 may be formed by a spring blade 31. The poultry-carrier may further comprise at least one actuatable clamp 4, which may also be referred to as clamping element 4. The clamp 4 may be movable between a locking position, as indicated in this figure, and an unlocking position. In the locking position, as indicated in this figure, the actuatable clamp 4 is positioned to secure and/or clamp a part of the poultry with respect to the carrier 3. In the unlocking position, the clamp 4 is positioned such that the poultry is unsecured and/or unclamped allowing for unloading poultry. Optionally, the clamp 4 or the carrier 3 comprises at least one locking part 25 configured to be moved between said locking position and said unlocking position, and an actuating element 7, preferably position at a distance from said locking part 25, configured to be actuated by the device to cause movement of the locking part 25 between said locking position and said unlocking position. In particular the locking part 25 or clamping part 25 and the actuating element 7 preferably are arranged at opposing sides of the carrier structure 3B. The clamp 4 is preferably pivotally attached to the poultry carrier 3, in particular the carrier structure 3B thereof. Said clamp 4 preferably extends through an opening 32 of the carrier structure 3B. Preferably. The poultry carrier 3 further comprises at least one latch 9, in particular a resilient latch, for locking the actuatable clamp 4 in at least one of the locking position or unlocking position.

The above-described inventive concepts are illustrated by several illustrative embodiments. It is conceivable that individual inventive concepts, including inventive details, may be applied without, in so doing, also applying other details of the described example. It is not necessary to elaborate on examples of all conceivable combinations of the above-described inventive concepts, as a person skilled in the art will understand numerous inventive concepts can be (re) combined in order to arrive at a specific application and/or alternative embodiment.

The ordinal numbers used in this document, like "first", "second", and "third" are used only for identification purposes. Hence, the use of expressions like a "second" component, does therefore not necessarily require the co-presence of a "first" component. By "complementary" or "co-acting" components is meant that these components are configured to co-act with each other. However, to this end, these components do not necessarily have to have complementary forms. The verb "comprise" and conjugations thereof used in this patent publication are understood to mean not only "comprise", but are also understood to mean the phrases "contain", "substantially consist of", "formed by" and conjugations thereof.

The invention claimed is:

1. A device for removing meat from poultry, comprising:
   at least one conveyor for transporting pieces of poultry along a transport path;
   at least one poultry carrier attached to and/or forming part of said at least one conveyor wherein each poultry carrier is configured to carry and/or support at least one piece of poultry having poultry meat,
   at least one pre-cutting section arranged along the transport path of the at least one conveyor, comprising at least one pre-cutting element positioned such that at least a part of the poultry meat is partially separated from a remaining part of the at least one piece of poultry to form at least one pre-cut poultry part and a remaining poultry part, and at least one meat separation section, arranged downstream of said pre-cutting section along the transport path of the at least one conveyor, comprising at least one rotatable cutting element for making a separating incision to separate said at least one pre-cut poultry part from said remaining poultry part to form a separated poultry part, wherein said meat separation section is further configured to physically remove said separated poultry part from said remaining poultry part in at least direction away from the transport path.

2. The device according to claim 1, wherein the at least one pre-cutting element comprises at least one non-linear blade section.

3. The device according to claim 1, wherein the at least one pre-cutting element is configured to pre-cut the at least one piece of poultry such that two distant poultry meat flaps are created which are positioned at opposite sides of an uncut part of the at least one piece of poultry, and/or wherein the at least one pre-cutting element is configured to pre-cut a poultry back such that two distant poultry back meat flaps are created which are positioned at opposite sides of a backbone of a poultry ribcage.

4. The device according to claim 1, further comprising at least one poultry meat product alignment section, arranged between the pre-cutting section and the meat separation section, for aligning the at least one piece of poultry with respect to the rotatable cutting element.

5. The device according to claim 4, wherein the alignment section comprises at least one alignment element to move at least a part of the pre-cut poultry part away from the remaining poultry part to create at least one space between the pre-cut poultry part and the remaining poultry part.

6. The device according to claim 5, wherein the at least one alignment element is configured as a guide bar for guiding the pre-cut poultry part and/or as slide bar for allowing the pre-cut poultry part to slide and/or to be pulled over said slide bar.

7. The device according to claim 5, wherein the at least one alignment element is aligned with the rotatable cutting element of the meat separation section.

8. The device according to claim 5, wherein at least a part of a highest edge of the at least one alignment element is positioned at the same level or at a higher level compared to a cutting location of the rotatable cutting element.

9. The device according to claim 5, wherein at least a part of a highest edge of the at least one alignment element is positioned at substantially the same level or at a lower level compared to the at least one pre-cutting element.

10. The device according to claim 5, wherein the at least one alignment element is configured to lift at least one pre-cut poultry part in a direction away from the remaining poultry part to create at least one space.

11. The device according to claim 1, wherein the cutting element comprises an axially rotatable disc, wherein a cutting edge is provided at a circumferential edge of said disc.

12. The device according to claim 11, wherein the axis of rotation of the disc is inclined with respect to the transport path, and wherein a cutting location of the rotatable disc is a lowest location of the disc.

13. The device according to claim 12, wherein the radius of said disc is at least 10 centimeters.

14. The device according to claim 1, further comprising at least one counterpressure section, said counter pressure section comprising at least one counterpressure element arranged along the transport path in proximity of and/or overlapping with, an upstream part of the pre-cutting element, arranged at a side of the pre-cutting element facing away from the conveyor.

15. The device according to claim 14, wherein the at least one counter pressure element is formed by a roller and/or a belt.

16. The device according to claim 15, wherein said roller and/or belt is non-driven.

17. A method of removing meat from poultry, comprising the steps of:

A) loading at least one poultry carrier with at least one piece of poultry having poultry meat, B) conveying said poultry carrier with at leat one piece of poultry at least along a pre-cutting section and a separation section, wherein:

i. in the pre-cutting section, at least a part of the poultry meat is partially separated from a remaining part of the poultry by at least one pre-cutting element to form at least one pre-cut poultry part and a remaining poultry part, and wherein ii. in the separation section, at least one separating incision is made by at least one rotatable cutting element to separate said at least one pre-cut poultry part from said remaining poultry part, C) removing said separated poultry part from said remaining poultry part in at least a direction away from the transport path, wherein said separated poultry part is unloaded from the device, and D) unloading the remaining poultry part from the at least one poultry carrier.

*    *    *    *    *